(12) United States Patent
Brezis et al.

(10) Patent No.: US 11,853,911 B1
(45) Date of Patent: Dec. 26, 2023

(54) SYSTEM AND METHOD FOR DATA STRUCTURING FOR ARTIFICIAL INTELLIGENCE AND A USER INTERFACE FOR PRESENTING THE SAME

(71) Applicant: PECAN AI LTD., Tel-Aviv (IL)

(72) Inventors: Noam Brezis, Hod-Hasharon (IL); Zohar Z. Bronfman, Tel-Aviv (IL)

(73) Assignee: PECAN AI LTD., Tel-Aviv (IL)

( * ) Notice: Subject to any disclaimer, the term of this patent is extended or adjusted under 35 U.S.C. 154(b) by 704 days.

(21) Appl. No.: 16/739,580

(22) Filed: Jan. 10, 2020

Related U.S. Application Data

(60) Provisional application No. 62/790,910, filed on Jan. 10, 2019.

(51) Int. Cl.
*G06N 5/04* (2023.01)
*G06F 16/22* (2019.01)
*G06N 20/00* (2019.01)

(52) U.S. Cl.
CPC ........... *G06N 5/04* (2013.01); *G06F 16/2282* (2019.01); *G06N 20/00* (2019.01)

(58) Field of Classification Search
CPC .......................... G06F 16/144; G06F 16/2282
USPC .............................................. 706/15; 707/708
See application file for complete search history.

(56) References Cited

U.S. PATENT DOCUMENTS

| | | | | |
|---|---|---|---|---|
| 10,467,550 | B1* | 11/2019 | Gupta | .................... G06N 20/00 |
| 2018/0165475 | A1* | 6/2018 | Veeramachaneni | ... G06F 16/221 |

\* cited by examiner

*Primary Examiner* — Hung T Vy
(74) *Attorney, Agent, or Firm* — Orrick, Herrington & Sutcliffe LLP

(57) ABSTRACT

A data structuring system that provides a user interface to enable data wrangling and modeling, and methods for making and using the same.

20 Claims, 14 Drawing Sheets

```
Advanced edit
 1
 2  SELECT /*Type: E*/
 3      EID.CustomerID,
 4      Repeat.Marker
 5  INTO
 6      #Entity
 7  FROM
 8      ProdDB.WideWorldImporters.Sales
              .Customers AS EID
 9  CROSS JOIN
10      helpers.repeat_monthly AS Repeat
11  WHERE
12      Repeat.Marker < DATEADD(MONTH,-2
              ,GETDATE())
13  ;
14
15  SELECT /*Type: T*/
16      Entity.CustomerID,
17      Entity.Marker,
18      CASE WHEN ActionsAmount.ActionsCount
              > 0 THEN 0 ELSE 1 END Label
19  INTO
20      #Target
21  FROM
22      #Entity AS Entity
23  LEFT JOIN
24  (
25  SELECT
26      COUNT(cid42.OrderDate) ActionsCount,
27      NACID.Marker,
28      NACID.CustomerID
29  FROM
30      #Entity AS NACID
31  LEFT JOIN
32      ProdDB.WideWorldImporters.Sales
              .Orders AS cid42
33  ON
34      NACID.CustomerID = cid42.CustomerID
35  WHERE
36      cid42.OrderDate
37      BETWEEN NACID.Marker AND DATEADD (MONTH
              ,2,NACID.Marker)
38  GROUP BY
39      NACID.Marker,
40      NACID.CustomerID
41  ) AS ActionsAmount
42  ON
43      Entity.Marker = ActionsAmount.Marker
44  AND
45      Entity.CustomerID = ActionsAmount
              .CustomerID
46  ;
47
48
```

Fig. 4C

```
Advanced edit
 1
 2  SELECT /*Type: E*/
 3      EID.CustomerID,
 4      Repeat.Marker
 5  INTO
 6      #Entity
 7  FROM
 8      ProdDB.WideWorldImporters.Sales
 9          .Customers AS EID
10  CROSS JOIN
11      helpers.repeat_monthly AS Repeat
12  WHERE
13      Repeat.Marker < DATEADD(MONTH, -1, GETDATE
          ())
14
15  SELECT /*Type: T*/
16      Entity.CustomerID,
17      Entity.Marker,
18      CASE WHEN ActionsAmount.ActionsCount > 0
19          THEN 1 ELSE 0 END Label
20  INTO
21      #Target
22  FROM
23      #Entity AS Entity
24  LEFT JOIN (
25      SELECT
26          COUNT(*) ActionsCount,
27          SACID.Marker,
28          SACID.CustomerID
29  FROM
30      #Entity AS SACID
31  LEFT JOIN
32      AS cid12
33  ON
34  WHERE
35      BETWEEN SACID.Marker AND DATEADD(MONTH, 1
                                                    801
CANCEL    EDIT
```

SYSTEM AND METHOD FOR DATA STRUCTURING FOR ARTIFICIAL INTELLIGENCE AND A USER INTERFACE FOR PRESENTING THE SAME

CROSS-REFERENCE TO RELATED APPLICATIONS

This application claims priority to U.S. Provisional Patent Application Ser. No. 62/790,910, filed on Jan. 10, 2019, the contents of which are incorporated herein by reference in their entirety and for all purposes.

FIELD

The present disclosure relates generally to data management systems, and more specifically, but not exclusively, to systems and methods for data structuring for application in artificial intelligence.

BACKGROUND

Conventional data structuring is being done manually. For example, for a conventional predictive analysis system, manual preparation of the data that is used to train a predictive model is required. This manual preparation can include preprocessing the data (e.g., compensating missing/broken values, normalizing data, and so on), feature engineering (e.g., application of functions and aggregations over the fields), splitting train, test, and validation sets from entire data sets, joining tables from the same data source or different data sources, and gathering all features into a structured table. This manual preparation can also include addressing data leakage and transforming 3D data into 2D data. These conventional solutions are not only time-consuming, but can only be done by experienced data scientists or artificial intelligence experts. Further, such manual preparation brings with it a risk of introducing human bias into the predictions which are generated by machine learning models.

However, automation of data structuring is a non-trivial task. For example, source data typically lacks information regarding its structure, meaning, and interrelationships. As another example, source data is often rife with missing and/or broken values which are not amenable to direct use by machine learning models. As yet another example, source data can often be polluted with "future" data, that is to say data of a sort that will not yet be available during the timeframe in which a machine learning model is to make predictions. Where such "future" data is included in training sets, a machine learning model can become misconfigured insofar as it can come to rely on information which will not be available to it when making predictions. For reasons such as these, conventional approaches typically resort to making data preparation a manual endeavor, despite the high concomitant financial and person-hour costs.

Accordingly, there is a need for improved systems and methods for performing data structuring for artificial intelligence in an effort to overcome the aforementioned obstacles and deficiencies of conventional approaches.

BRIEF DESCRIPTION OF THE DRAWINGS

FIG. 4C is an exemplary diagram illustrating one embodiment of a screenshot for a graphical user interface which allows for viewing and/or editing of system-generated queries using the data structuring system of FIG. 1.

FIG. 8 is an exemplary diagram illustrating one embodiment of a screenshot for a graphical user interface which allows for viewing and editing of queries using the data structuring system of FIG. 1.

FIG. 9 is a further exemplary diagram illustrating one embodiment of a screenshot for a graphical user interface which allows for viewing and/or editing of system-generated queries using the data structuring system of FIG. 1.

FIG. 10A is a further exemplary diagram illustrating one embodiment of three graphical user interfaces which allow for provision of target information using the data structuring system of FIG. 1.

Figure 1:
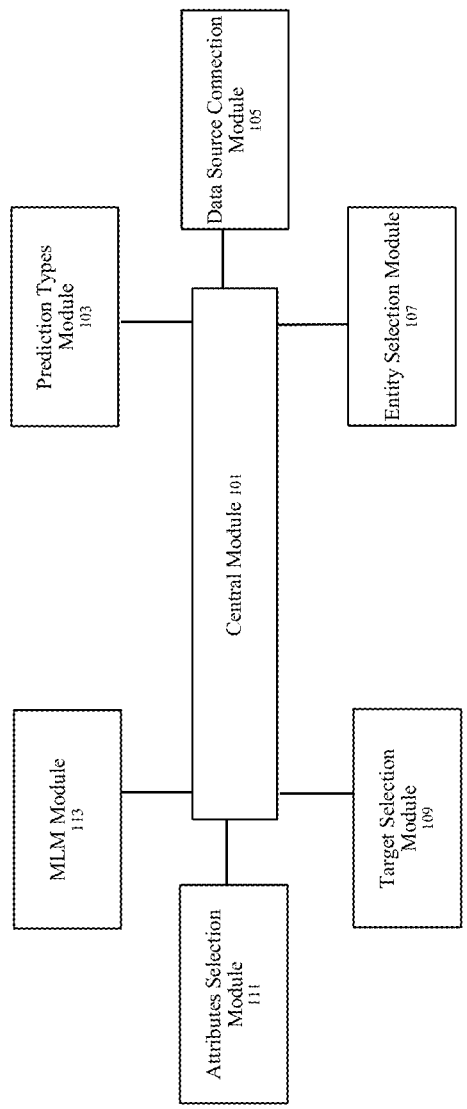
FIG. 1 is an exemplary top-level block diagram illustrating one embodiment of a data structuring system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available artificial intelligence systems are deficient because they require manual preparation of source data that is often incomplete and/or lacks information regarding its structure, meaning, and interrelationships, a system for automated data structuring can prove desirable and provide a basis for a wide range of machine learning applications, such as fraud detection and predictive analysis. This result can be achieved, according to one embodiment disclosed herein, by a system 100 for data structuring as illustrated in FIG. 1. The systems disclosed herein overcome the non-trivial technical challenges encountered in previous attempts to automate data structuring for such applications, as discussed below in more detail, and achieve other beneficial results and technical improvements as will be appreciated by those of skill in the art.

According to various embodiments disclosed herein, one or more software modules can act in the selection of one or more features for a machine learning model (MLM). The one or more software modules can also act in the selection of the MLM, and in training the MLM. Various embodiments will now be discussed in greater detail.

As shown in FIG. 1, the one or more software modules can include a central module 101, a prediction types module 103, a data source connection module 105, an entity selection module 107, a target selection module 109, an attributes selection module 111, and an MLM module 113.

According to various embodiments, a user can access a user interface (UI), such as one displayed in connection with an app or a website. The UI can be generated by the central module 101. By employing the UI, the user can access various functionality provided by several of the software modules 101-113. Shown in FIGS. 2-10B are various example UI screens which can be provided via the UI. It is noted that, in various embodiments, an automated responsive code builder can be used in generating the UIs.

Figure 2:
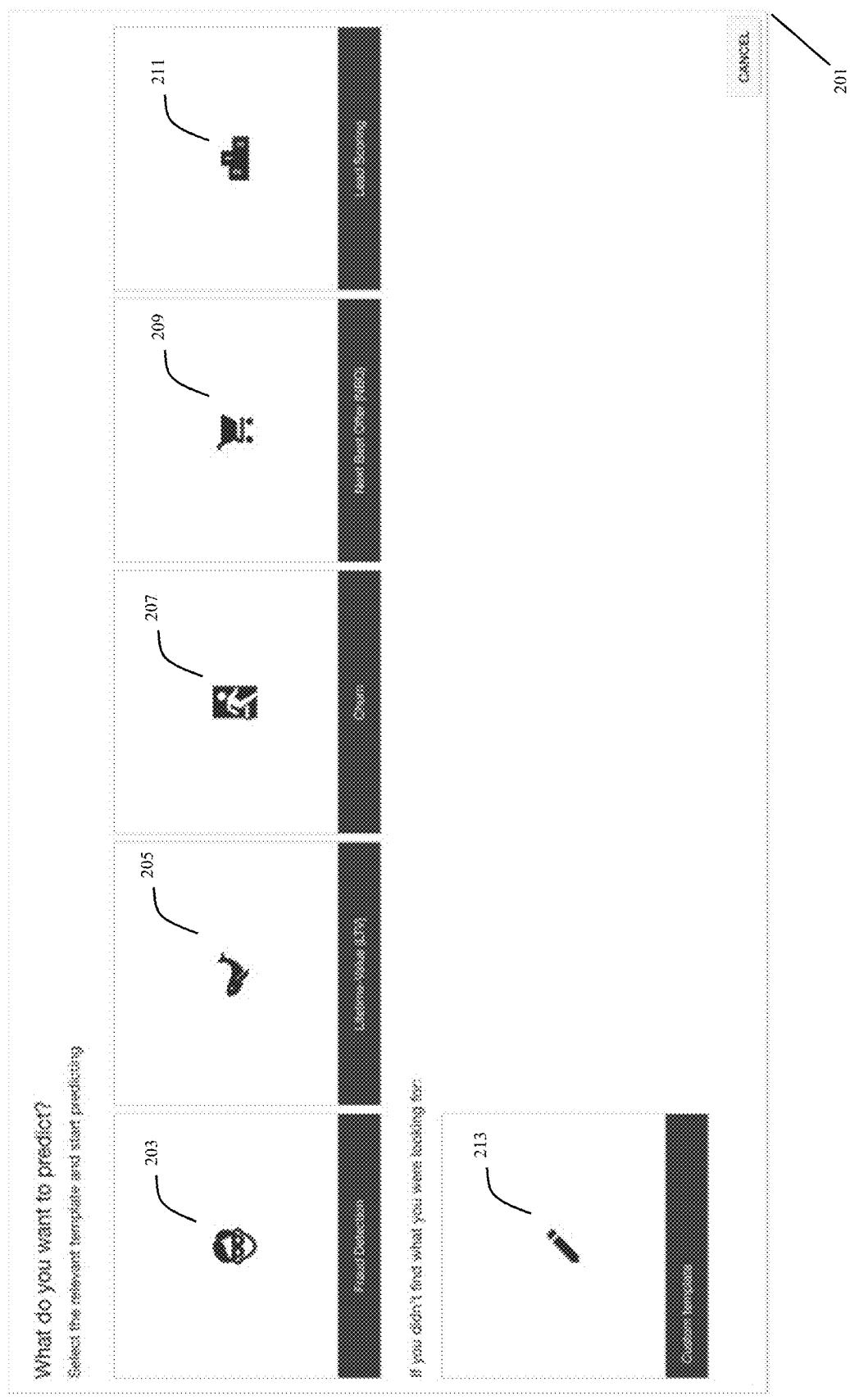
FIG. 2 is an exemplary diagram illustrating one embodiment of a screenshot for a graphical user interface which allows for selection of a prediction type/use case using the data structuring system of FIG. 1.

Turning to FIG. 2, shown is an example UI screen 201 which allows the user to select a desired prediction type/use-case. In particular, the UI of FIG. 2 allows the user to use displayed UI elements to select from among numerous prediction types/use cases, such as for example fraud detection 203, lifetime value (LTV) 205, customer churn 207, next best offer (NBO) 209, lead scoring 211, and custom prediction 213. The templates shown in the UI of FIG. 2 is for illustrative purposes only. Although not shown, the prediction types/use cases can further include inventory control, predictive maintenance, localization, sensor analysis, anomaly detection, credit score, risk/default, pricing optimization, fraud identification, financial projections, returning customers, user segmentation/profiling, net promoter score, and so on.

The various prediction type choices offered to the user can be generated by the prediction types module 103. According to an illustrative example, the user can select customer churn 207.

Subsequent to selecting one of the offered prediction types, the user can be provided with a UI screen which allows the user to provide information regarding a data source which holds data concerning the predictions which the user desires to be made in connection with options 203-213. For instance, in the illustrative example where the user has selected customer churn 207, the data source can hold customer and/or sales data. The UI screen can allow the user to specify a type for the data source. The various data source types offered to the user can be generated by the data source connection module 105. Data sources which can be used by the system can include relational databases, Enterprise Resource Planning (ERP) systems, and Customer Relationship Management (CRM) systems, to name just a few. As one example, the UI screen can allow the user to select from the types: a) Structured Query Language (SQL) server; b) comma-separated values (CSV) file; c) Amazon Redshift; and d) Teradata. Further examples of data sources which can be used by the system include, but are not limited to, Microsoft Azure SQL DB, Google Big Query, Salesforce, Oracle, MySQL, PostgreSQL, and various non-structured databases (e.g., Elasticsearch and/or MongoDB). The UI screen can also prompt the user to provide information for connection to the data source. The information for which the user is prompted can be indicated by the data source connection module 105. For example, where the user has specified the data source to be an SQL server, the connection information can include a host/server identifier (e.g., via IP address or fully-qualified domain name), a database name, and login credentials (e.g., user name and password). As another example, where the user has specified the data source to be a CSV file, the connection information can include a pathname and a file name. In some embodiments, the UI can allow the user to drag a file to the UI rather than explicitly (e.g., via keyboard entry) specifying the pathname and file name. The connection information provided by the user can be made available to the data source connection module 105. The data source connection module can use the connection information to access the data source. Although use of a single data source is discussed at various junctures herein, in various embodiments the system can access and draw data from multiple data sources.

Figure 3:
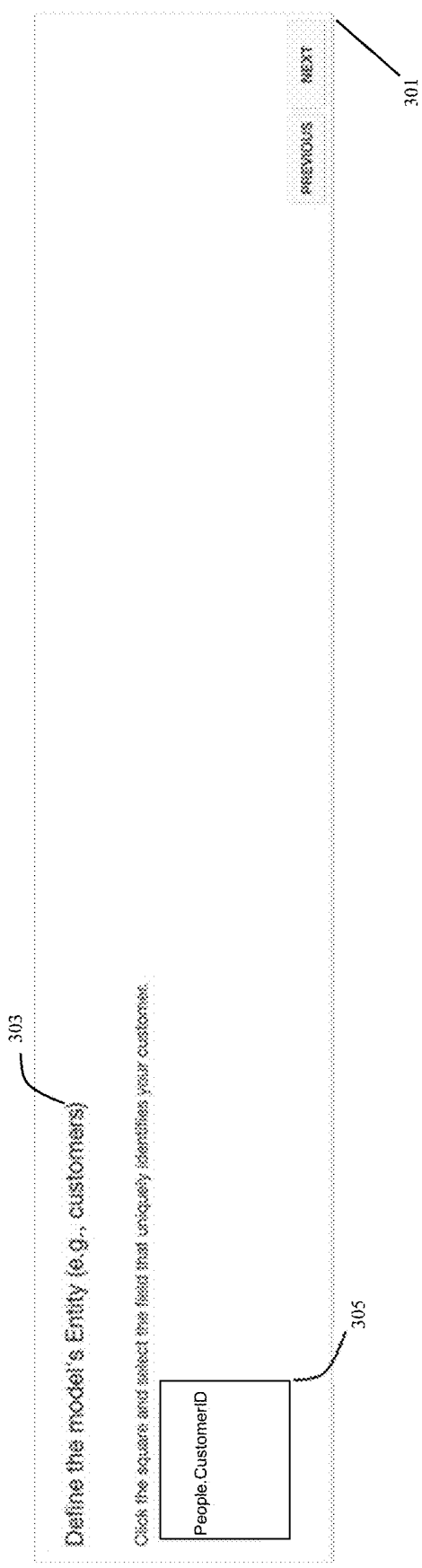
FIG. 3 is an exemplary diagram illustrating one embodiment of a screenshot for a graphical user interface which allows for provision of entity information.

Turning to FIG. 3, shown is an example UI screen 300 which allows the user to provide information regarding "entities" which are to be the subject of the predictions to be made. For example, in the illustrative example where the user has selected customer churn 207, the entities can be customers. Likewise, the entities can be customers where the user has selected LTV 205 or NBO 209. Where the user has selected fraud detection 203, the entities can be items which are potentially fraudulent (e.g., orders for products or services) and/or people who are potentially engaged in fraud (e.g., agents or cashiers). Where the use has selected lead scoring 211, the entities can be leads.

The UI screen 301 of FIG. 3 can request (303) that the user provide information regarding the entities. The entity selection module 107 can determine the information which the user is requested to provide. The information which the user is requested to provide can include an indication of a column which contains unique identifiers of the entities. The user can also be requested to provide an indication of table(s) which correspond to the column. For example, in the illustrative example where the user has selected customer churn 207, the user can be prompted for indication of a column which contains unique identifiers of customers. Likewise, the user can be prompted for indication of a column which contains unique identifiers of customers where the user has selected any one of LTV 205, NBO 209, or lead scoring 211. Where the user has selected fraud detection 203, the user can be prompted for indication of a column which contains unique identifiers of orders. More specifically, the user can be prompted to specify a primary key and table(s) which provide access to the column which contains the appropriate unique identifiers. Accordingly, in the illustrative example where the user has selected customer churn 207, the user might specify (305) "People.CustomerID" via the UI where the unique identifier of the entity was a customer identifier stored in a column accessible by a primary key CustomerID in a table People.

The information which the user is requested to provide can also include an indication of a column which contains time/date information for events which the user desires to serve as triggers for generating predictions. For instance, the user can be asked to provide such trigger information where the user selects any one of fraud detection 203, LTV 205, or lead scoring 211. In particular, the user can be prompted to specify a key and table(s) which provide access to the column which contains the time/date information. Accordingly, for example, suppose that fraud detection 203 is chosen. Here, the user might specify "Sales.OrderDate" via the UI where the event trigger information desired by the user were contained in a column accessible by a key OrderDate in a table Sales. In addition to selecting an event as a trigger for generating predictions, predictions can also be based on a predetermined schedule (e.g., repeated daily, monthly, or so on).

As one example, the user might specify tables and keys via keyboard entry. As another example, the user might specify tables via a drag-and-drop operation. For instance, the UI might allow the user to visually navigate to the People table, select the primary key CustomerID therefrom, and drop the selected primary key to a particular location on the UI.

Figure 4A:
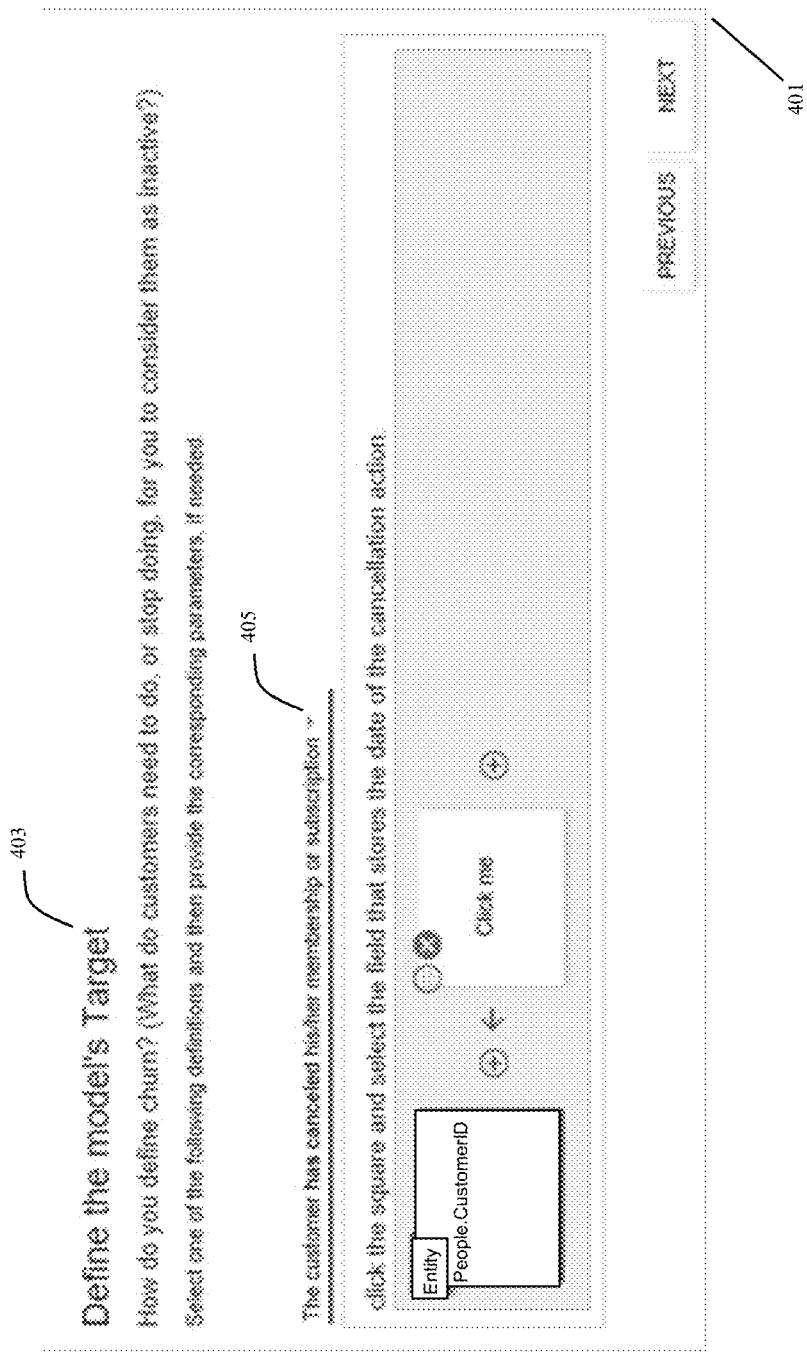
FIG. 4A is an exemplary diagram illustrating one embodiment of a screenshot for a graphical user interface which allows for provision of target information using the data structuring system of FIG. 1.

Turning to FIG. 4A, shown is an example UI screen 401 which allows the user to provide information regarding a "target," the target being that which is to be predicted. For instance, in the illustrative example where the user has selected customer churn 207, the target can be whether or not churn appears likely in view of data input to the MLM. Likewise, where the user has selected fraud detection 203, the target can be whether or not fraud appears likely in view of data input to the MLM. Also, where the user has selected LTV 205, the target can be a predicted lifetime value in view of data input to the MLM. Further, where the user has selected NBO 209, the target can be a predicted subsequent purchase or other customer action in view of data input to the MLM. Additionally, where the user has selected lead scoring 211, the target can be whether or not conversion (e.g., a purchase being made) appears likely in view of data input to the MLM.

The UI screen 401 of FIG. 4A can request (403) that the user provide information regarding the target. The target selection module 109 can determine the information which the user is requested to provide. The information can include a selection of a particular one of several indicated descriptions of the target. The indication and selection of the descriptions can, for instance, be via a pulldown UI element, a UI text field element, and/or a UI checkbox element. The requested information can also include an indication of one or more columns which characterize the target. The user can additionally be requested to provide an indication of one or more tables which correspond to the one or more columns. The requested information can also include an indication of a timeframe which characterizes the target (e.g., the user could be able to provide such indication via a UI text field element and/or a pulldown UI element).

For instance, in the illustrative example where the user has selected customer churn 207, the user can be prompted to select from the following descriptions of the target: a) "The customer has cancelled his/her membership or subscription"; b) "The customer has been inactive for a certain period of time"; and c) "The customer has not reached a particular goal in a certain period of time." Where the user selects (405) description "a)," the user can be prompted to specify a key and table(s) which provide access to the column which contains the date of the cancellation actions. As an illustration the user might specify Sales.CustomerCatagories.ValidTo the table "Sales," the nested table "CustomerCategories," and the column "ValidTo." Where the user selects description "b)," the user can be prompted to indicate a timeframe for the period of time, and further to indicate a key and table(s) which provide access to the column which contains evidence of the inactivity. Where the user selects description "c)," the user can be prompted to indicate four items of information. Firstly, the timeframe for the period of time. Secondly, the particular goal (e.g., via a UI textfield). Thirdly, a key and table(s) which provide access to the column which contains a date for an achievement of the goal. And, fourthly, a key and table(s) which provide access to the column which contains information describing an achievement of the goal (e.g., a column indicating whether or not one dozen orders have been made).

Likewise, where the user has selected fraud detection 203, the user can be prompted to specify a key and table(s) which provide access to the column which contains data which indicates whether or not fraud has occurred. As an illustration, the user might indicate "Sales. Invoices.IsCreditNote" for a circumstance where such a column contains null data for non-fraudulent orders, and other than null data for fraudulent orders. As another example, where the user chose LTV 205, the user could be prompted to select from the following descriptions of the target: a) "The sum of all of the customer's spending in a specific amount of time"; b) "The number of the customer's actions in a specific amount of time"; c) "The sum of all of the customer's spending"; and d) "The number of the customer's actions." Where the user selects description "a)" or "b)," the user can be prompted to indicate two items of information. Firstly, a timeframe for the "specific amount of time" Secondly a key and table(s) which provide access to a column which contains information describing LTV as defined by the user. As an illustration, where the user selected description "a)," the user might specify "Sales.CustomerTransactions.TransactionAmount." Where the user selects "c)" or "d)," the user can be prompted to indicate a single item of information, in particular a key and table(s) which provide access to a column which contains information describing LTV as defined by the user. As such, where the user selects "c)" or "d)," the user is not prompted for a timeframe.

Also, where the user selects NBO 209, the user can be prompted to indicate a key and table(s) which provide access to a column which contains information describing NBO as defined by the user. As an illustration, the user might provide indication of a column containing a unique product identifier in the case where the user defined NBO as the purchase of a subsequent product. In some embodiments, the user can be provided which a checkbox which indicates whether or not to "Allow repeating products." As an illustration, the user might check this box when the user wishes for the system to consider the possibility that a consumer might tend to purchase a particular product repeatedly. For example, a consumer might tend to purchase printer toner repeatedly. Finally, where the user selects lead scoring 211, the user can be prompted to indicate a key and table(s) which provide access to a column which contains information describing a conversion as defined by the users. In some embodiments, the system can indicate that such information be date information, such as a date when conversion of a customer occurred. As an illustration, the user might specify "Sales.Orders.OrderDate" where the user considered conversion of a customer to occur when a user placed an order for an item, such as an item for which advertisements had previously been displayed to the user.

It is noted that, in some embodiments, the user can be prompted to provide information for a join (e.g., a join wherein the condition of the join involves equality). For instance, the user can be prompted to provide information for a join when one or more columns specified by the user with respect to entity exist in a different table than one or more columns specified by the user with respect to target. In particular, the user can be prompted to indicate in one table (e.g., a table specified by the user in connection with entity) a primary and/or non-foreign key, and to indicate in a second table (e.g., a table specified by the user in connection with target) a corresponding foreign key. As an illustration, where the user specified a Customers table in connection with entity and a Purchases table in connection with target, the user might (e.g., via UI pulldowns) select primary key Customers.CustomerID for the first table and corresponding foreign key Purchases.Orders.CustomerID for the second table for an equality condition join. The user can also be prompted to select from among different types of joins (e.g., from among left, right and inner joins). In some embodiments, the system can use the results of such a join operation allowing a user to select—and/or receive automatic suggestion of—attributes for employment in connection with the MLM, as discussed hereinbelow.

Figure 4B:
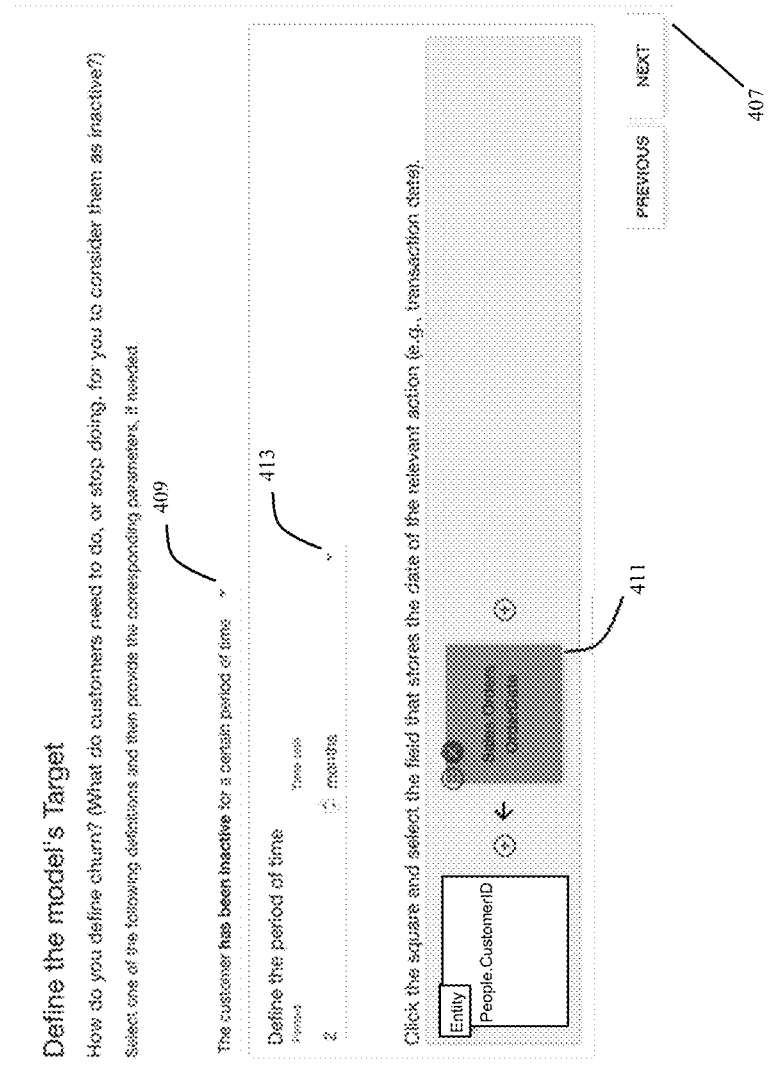
FIG. 4B is an exemplary diagram illustrating another embodiment of a screenshot for a graphical user interface which allows for provision of target information using the data structuring system of FIG. 1.

With further regard to selection of the target by the user, in various embodiments a value specified by the user in connection with the target can a generated column, or otherwise be calculated on-the-fly rather than being directly stored in a data source. Turning to FIG. 4B, shown is a UI screen 407 where, in accordance with that which has been discussed above, the user has: a) selected customer churn 207; b) selected (409) "The customer has been inactive for a certain period of time"; c) indicated (411) "Sales.Orders.OrderDate" as holding relevant date information; and d) used the UI to indicate (413) the period of time to be two months. Here, the data source has a column which holds order dates (i.e., Sales.Orders.OrderDate), but does not have a column which indicates whether or not a customer has been active for two months. As such, the system can implement whether or not the customer has been active for two months as an on-the-fly calculation, in particular an on-the-fly calculation taking into account factors including Sales.Orders.OrderDate and the date when the calculation is performed. As discussed in greater detail below, in some embodiments the system can allow the user to view and/or edit the queries which have been generated by the system. Shown in FIG. 4C is a UI screen 415 allowing for such viewing and/or editing by the user, the UI screen 415 of FIG. 4C in particular allowing the user to view and/or edit code including code by which the system performs the on-the-fly calculation to determine whether or not a customer has been active for two months.

As referenced above, the UI screen 201 of FIG. 2 also allows the user to select custom prediction 213. According to various embodiments, where the user selects custom prediction 213 the user can, as discussed in connection with options 205-211, be presented with screens for selecting entity and target. However, the user might receive fewer and/or less detailed prompts from the system than those discussed in connection with options 205-211. For instance, the UI screen 301 of FIG. 3 might allow the user to directly indicate table(s) and keys for entity unique identifier, and the UI screen of FIG. 4A might allow the user to directly indicate one or more tables and keys for target, in absence of detailed system-generated prompts. According to various embodiments, where the user selects custom prediction 213, the system can allow the user to specify one or more corresponding SQL queries. As one example, such an SQL query can regard a target selected by the user.

Figure 5:
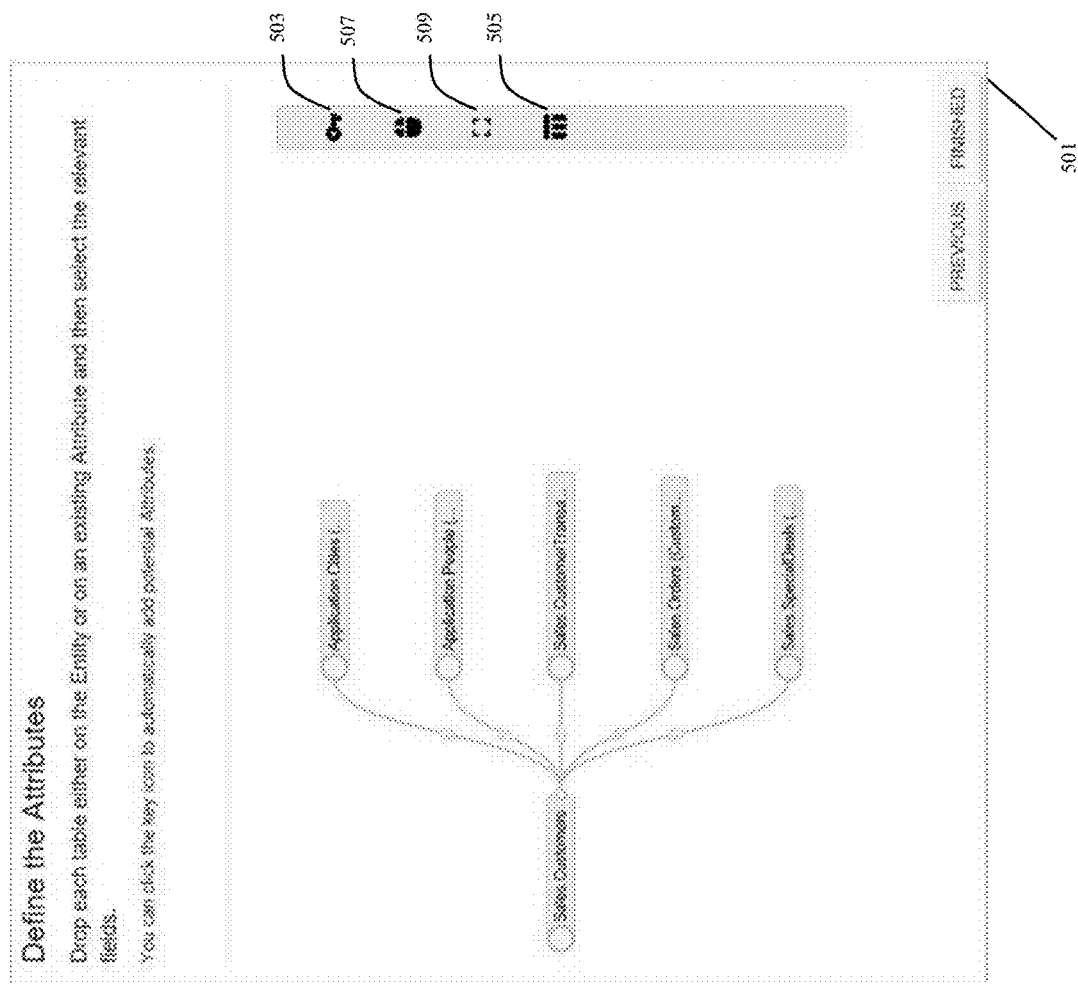
FIG. 5 is an exemplary diagram illustrating one embodiment of a screenshot for a graphical user interface which allows for selection of attributes using the data structuring system of FIG. 1.

Turning to FIG. 5, shown is an example UI screen 501 which allows the user to select "attributes" of the entity. The functionality discussed herein in connection with FIG. 5 can be performed by the attributes selection module 111. The attributes can correspond to features which are provided to the MLM during training of the MLM, and when asking the MLM to make predictions. As a high level example, suppose that the entity were customers, and that the MLM was to predict, based on inputs, whether or not a given customer would churn. In this high-level example, the attributes/features might be residence cities and income levels of customers. As such, in this high-level example, when predicting whether or not a given customer would churn, the MLM could take as inputs indication of the residence city and income level of the customer (e.g., encoded as one or more vectors). Subsequently, the MLM could output a prediction as to whether or not the given customer would churn. Further according to this high-level example, during training, the MLM could receive one or more training sets. Each element of the training set could include: 1) as training data inputs, indication of the residence city and income level of the customer; and 2) as training data outputs, data indicative of whether or not the customer had churned. According to various embodiments, where the user selects custom prediction 213, the user can specify one or more SQL queries which regard attributes chosen by the user.

Returning to the UI of FIG. 5, shown in the figure are icons including a key icon 503. By clicking on the key icon 503, the user can request that the system suggest attributes for selection by the user. As noted, when identifying the unique identifier of the entity, the user specified a primary key and table(s) corresponding to that unique identifier. In generating the suggested attributes, the system can examine these table(s), and find some or all foreign keys associated with the primary key therein. Next, the system can follow those foreign keys to their respective tables. In each respective table, the system can find some or all primary (and otherwise non-foreign) keys associated with the found foreign keys. Subsequently, the system can suggest as possible attributes for the MLM those primary (and otherwise non-foreign) keys. By selecting a key as an attribute, the user indicates that the system should use data accessible by that key as features for the MLM. It is noted that, in following the foreign keys to their respective tables, the system can follow the foreign keys to the tables in which they exist as non-foreign keys.

Also, the system can proceed in this fashion one or more levels deeper in a recursive fashion. As such, when following the foreign keys to their respective tables as discussed, the system can look for foreign keys in these tables. The system can then follow these deeper foreign keys to their respective deeper tables and act in a manner analogous to that discussed, including suggesting columns which correspond to found keys as possible attributes for the MLM. In some embodiments, the user can select the desired number of levels to which the system should recurse in this way.

Further still, the system can also suggest as attributes for the MLM the keys associated with the user-specified primary key in the table(s) which hold that primary key. Also, in some embodiments, the system can suggest keys/columns as possible attributes for the MLM by presenting, on the UI of FIG. 5, UI elements corresponding to the table(s) which hold those keys. In these embodiments, by clicking on a UI element for a table, the user can be presented with a list of the keys of the corresponding table, where each element of the list has a corresponding UI checkbox element. In some embodiments, the system can pre-select (i.e., set the corresponding UI checkbox element to selected/"yes") those keys/columns of the table that the system is suggesting as attributes. The user can then accept the pre-selections of keys by the system, de-select one or more of the keys pre-selected by the system, and/or select additional keys.

Also, in some embodiments, the user can be presented with a UI element allowing for selection/deselection of all keys of the table. Subsequent to completing his/her selections, the user can press a "done" UI button element, causing the system to use the selected keys(s)/column(s) as attributes for the MLM. The UI elements for tables can, in some embodiments, be presented in a tree-like diagram. Each node of the tree can be one of the noted UI elements for tables. By clicking on a node/table, the user can indicate which columns of that table are going to be used as attributes. Further in this tree-like diagram, tables can be connected by lines which represent joins between the tables. By clicking on a line, the user can alter the composition of the join in a manner analogous to that discussed. In some embodiments, the joins can be pre-composed by the system, such that clicking on a line allows the user to see and/or alter the pre-composed join. As an illustration, such a pre-composed join can be an equality-condition join between a primary key of a first table and a corresponding foreign key of a second table, with the system having automatically determined the primary key-foreign key relationship (e.g., due to key name similarity, for instance key "DeliveryCityID" in the first table as being similar in name to key "CityID" in a second table). In some embodiments, the composition of the join—such as the keys indicated in the join and the type of join (e.g., left vs. right vs. inner)—can dictate which keys are presented to the user for selection as attributes, as discussed.

Additionally, in various embodiments the user can drag tables to the UI, or select tables via a UI frame which is exposed subsequent to the user clicking a table icon 505 of the UI of FIG. 5. Next, the user can connect the tables via user-defined joins and select one or more keys of the tables as attributes. In this way, the user can manually choose tables, and select keys thereof to be used as attributes. Additionally, the user can zoom and pan along the tree-like diagram, using the UI. In some embodiments, the user can click on a mouse icon 507 of FIG. 5 to enter a mode in which the user can perform such zoom and pan. Further, the user can enter a full screen mode for viewing the tree-like diagram. In some embodiments, the user can click on a reticle icon 509 of FIG. 5 to enter such a full screen mode.

Subsequent to completing selection of attributes via the UI of FIG. 5, the user can be prompted to provide, via a UI text field element, a name for the prediction task which the user has configured via the actions discussed in connection with FIGS. 2-5. After providing a name for the prediction task, the user can be presented with a UI button which allows the user to request that the system train the MLM. Upon the user selecting this button, the system can commence training of the MLM. As such, the system can provide the MLM with a training set. Each member of the training set can correspond to a given entity (e.g., a given customer) for which data is held in the data source which was specified by the user. Further, each member of the training set can include, as training data inputs, features for the given entity which correspond to the attributes selected by the user. As an illustration, where "Customer.ResidenceCity" was selected by the user as an attribute, the features for the given entity could include the data held in the data source (or calculated on-the-fly by the system) for the given entity for Customer.ResidenceCity. Also, each member of the training data set can include, as training data output, data for the given entity which corresponds to the target selected by the user.

As an illustration, where "Sales.Orders.OrderShipped" was selected by the user for the target, the training data output for the given entity could include the data held in the data source (or calculated on-the-fly by the system) for the given entity for Sales.Orders.OrderShipped. In some embodiments, the system can split such data for entities into a both a training set and a test set. The training set could be as discussed, and correspond to certain entities (e.g., certain customers) for which the data source holds data. The training set can be used to train the MLM, as discussed. The test set could correspond to others of the entities (e.g., other customers) for which the data source holds data. Each element of the test set can be similar in composition to the discussed training set elements. However, instead of using the features for the given entity as training data inputs, these features can be fed to the MLM, and the MLM can then generate a prediction output based on the features. The generated output can then be compared to that which the data source holds for the given entity for the target specified by the user. As an illustration, where "Sales.Orders.OrderShipped" was selected by the user for the target, the system could compare the data held in the data source for the given entity under Sales.Orders.OrderShipped to the output of the MLM. By acting in this way for each given entity of the test set, the system can create various statistics characterizing how well the predictions of the MLM track ground truth according to the data source. Additionally and/or alternatively, the system can split such data for entities according to time. In this embodiment, the more recent information can be used in the test set. The discussed operations regarding training and testing the MLM can be performed by the MLM module 113.

Figure 6:
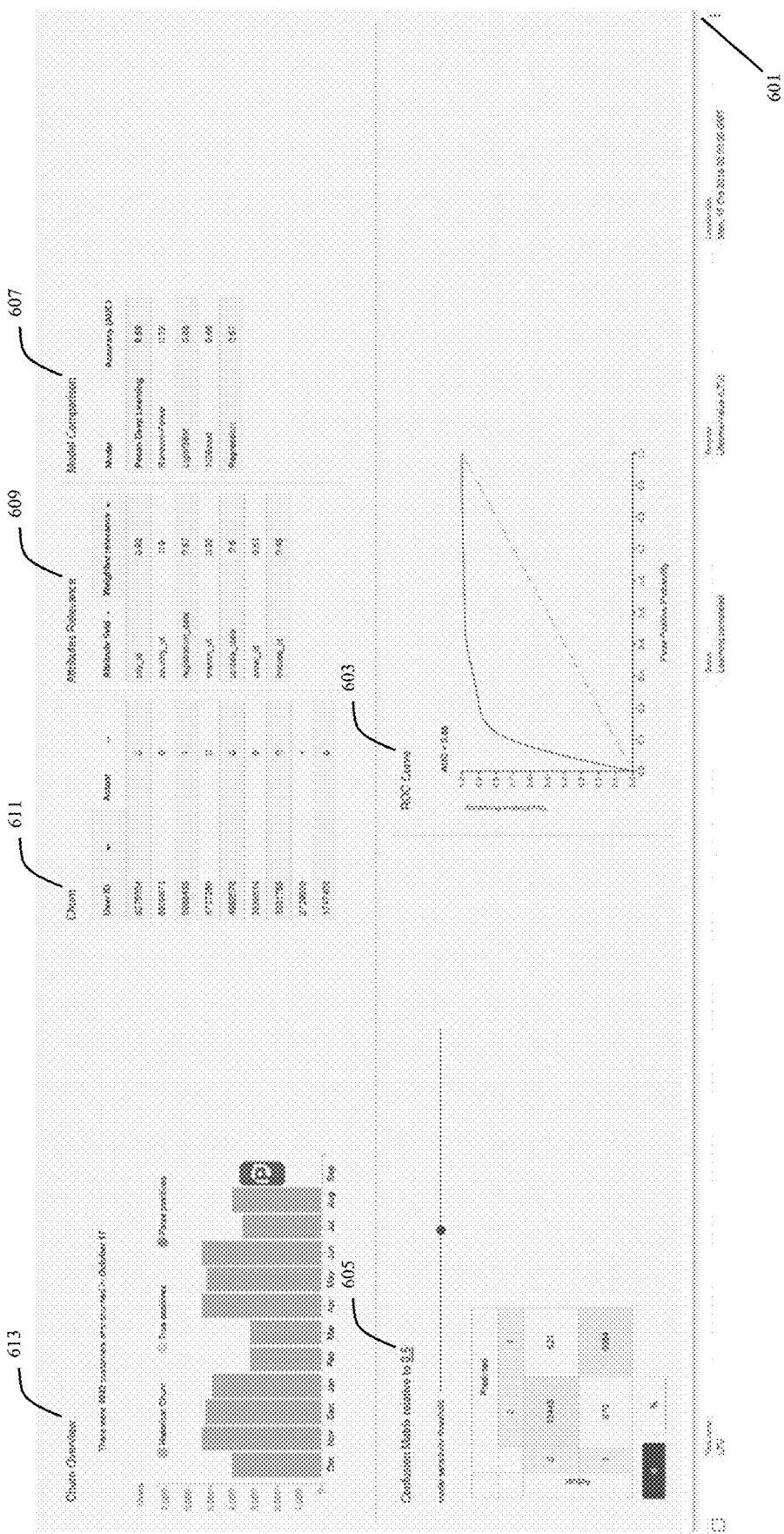
FIG. 6 is an exemplary diagram illustrating one embodiment of a screenshot for a graphical user interface which allows for viewing of various characterizations of prediction quality using the data structuring system of FIG. 1.

Turning to FIG. 6, shown is a UI screen 601 by which the user can view various characterizations of the quality of the predictions generated by the MLM. The functionality discussed herein in connection with FIG. 6 can be performed by the MLM module 113. The characterizations can reflect the discussed test set operations. As depicted by FIG. 6, these characterizations can include indications of true positives and false positives, such as receiver operating characteristic (ROC) curves 603 and confusion matrices 605. As also depicted by FIG. 6, the UI can present information 607 characterizing how well the MLM of the system is making predictions versus other models (e.g., regression models). In order to present such information, the system can firstly train each of the other models using the training set discussed above. Next, the system can, in manner analogous to that discussed, use the test set to characterize prediction quality of each of these other models. Then, by comparing the prediction quality of each of these other models to the MLM of the system, the system can generate the noted characterizing how well the MLM of the system is making predictions versus other models. As also depicted by FIG. 6, the UI can provide indication 609 of the relevance of each of the attributes. The system can generate these indications of relevance by performing a statistical analysis which determines the extent to which variance in a given attribute, when provided to the MLM as a feature, leads to variance in MLM output. Also, in various embodiments, the UI can provide indication of the influence/effect of each of the attributes. As such, in various embodiments the UI can provide one or more Partial Dependence Plots (PDPs), Shapley values, and/or Shapley Additive exPlanations (SHAPs). For instance, the UI can display one or more SHAP summary plots, SHAP feature relevance plots, and/or SHAP dependence plots. Then, as additionally depicted by FIG. 6, the UI can provide per-entity indication 611 of observed/historical data (according to the example of FIG. 6, providing per-user/customer ID indication of presence or absence of observed/historical churn), and overview information 613 which can include co-plotting of observed/historical data, true positives, and false positives.

Figure 7:
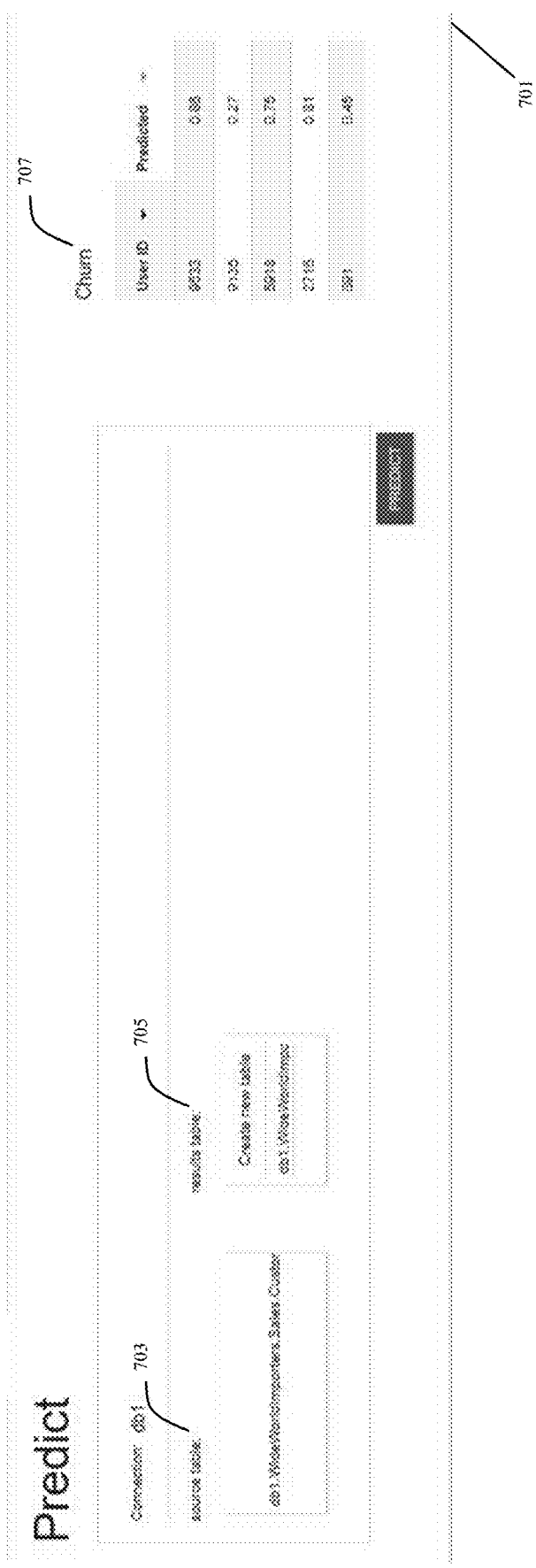
FIG. 7 is an exemplary diagram illustrating one embodiment of a screenshot for a graphical user interface which allows for requesting that predictions be generated using the data structuring system of FIG. 1.

Turning to FIG. 7, shown is a UI screen 701 by which the user can request that the MLM generate predictions. The functionality discussed herein in connection with FIG. 7 can be performed by the MLM module 113. When requesting that predictions be made, the user can use the UI to: 1) select (703) an input data source and/or a table which holds data to be inputted to the MLM; and/or 2) select (705) an output data source and/or a table into which predictions output by the MLM can be recorded. Subsequently, for some or all of those entities (e.g., customers) for which data is held in the input data source and/or table, the system can draw data which corresponds to the attributes specified by the user. Alternately or additionally, the system can calculate on-the-fly data which corresponds to various attributes specified by the user (e.g., where one or more attributes specified by the use correspond to generated columns). For each such entity, this data can be provided as input features to the MLM, and in response the MLM can generate a prediction (i.e., a prediction corresponding to the target specified by the user). Then, the system can record the output of the MLM in the output data source and/or table. In this way, the system can use the MLM to generate a prediction for some or all of the particular entities for which the input data source and/or table holds data. In some embodiments, as an alternative or in addition to recording the predictions output by the MLM in the output data source and/or table, the system can present (707) one of more of these predictions to the user via the UI of FIG. 7. For example, the system can present a table on the UI which lists the unique identifier of each entity for which the MLM made a prediction, and also the value which the MLM predicted for that entity (i.e., a predicted value corresponding to the target).

In some embodiments, the system can formulate various data source queries, such as SQL queries. Such formulation can be performed by the MLM module 113. In particular, the system can formulate: 1) queries which yield from the data source data corresponding to the user's indication of entity; 2) queries which yield from the data source data indicated by the user as attributes; and/or 3) queries which yield from the data source data indicated by the user for the target. In various embodiments, such indications from the user can be stored by the system in one or more objects (e.g., one or more JavaScript Object Notation (JSON) objects). Subsequently, the system can process these one or more objects in formulating the queries.

As an illustration, where the user indicated that Residents.YearsOld and RecreationSection.FavoriteSport should be used as attributes, the system can generate one or more queries which draw data from the columns specified by Residents.YearsOld and RecreationSection.FavoriteSport. As another illustration, where the user indicated that Residents.TerminatedLease should be used for target, the system can generate one or more queries which draw data from the column specified by Residents.TerminatedLease. In some embodiments, the queries generated by the system can include join queries. Further, in some embodiments the system can allow the user to view and/or edit the queries which have been generated by the system. For example, included on the entity UI screen discussed in connection with FIG. 3 can be a UI button which allows the user to view and/or edit the queries (e.g., SQL queries) that the system has generated responsive to the user's inputs regarding entity. In this regard, shown in FIG. 8 is an example UI screen 801 presented to the user for viewing and/or editing such system-generated queries. As another example, included on the entity UI screen discussed in connection with FIG. 4A can be a UI button which allows the user to view and/or edit the queries that the system has generated responsive to the user's inputs regarding target.

Likewise, as a further example, included on the entity UI screen discussed in connection with FIG. 5 can be a UI button which allows the user to view and/or edit the queries that the system has generated responsive to the user's inputs regarding attributes. As yet another example, included on a UI screen which allows the user to provide a prediction task name can be a UI button which allows the user to view and/or edit all of the queries which the system has generated (e.g., both queries relating to target and queries relating to attributes). It is further noted that, in various embodiments, the system can formulate various data source queries in connection with performing on-the-fly calculations for generated columns. For instance, where such an on-the-fly calculation operates on values held in the data store, the system can generate one or more queries which draw such values from appropriate columns of the data store. In various embodiments, the system can employ referential dynamic code components in formulating data source queries. As an example, the discussed functionality by which the system formulates data source queries can be termed "template SQL (TQL)."

In various embodiments, the system can perform one or more past horizon operations when selecting attribute data to be included in training sets, to be included in test sets, and/or to be provided to the MLM when generating predictions. Such past horizon operations can be performed by the MLM module 113. In some embodiments, in implementing past horizon operations, the system can distinguish between two types of attributes—static attributes, and time-dependent/dynamic attributes. Static attributes can be the variables that are "stationary," that is to say variables which do not alter with time (e.g., gender, date of birth, demographic info etc.). Dynamic attributes can be variables that are time-dependent, meaning that, at a certain frequency additional data can be added to a given column for a given entity. As an illustration, where a column corresponds to purchases by a given entity (e.g., a given customer), data can be added to the column each time a purchase is made. As such, for a given entity, there can be much data corresponding to dynamic attributes (e.g., data corresponding to many purchases). This large amount of data can present a challenge in determining how much of this data should be provided to the MLM. Said differently, a certain depth of historical data can be associated with the table(s) and key which correspond to each of the particular attributes selected by the user. As an illustration, where the user has selected an attribute corresponding to Sales.TransactionDate, for each given entity (e.g., customer) there can be a multitude of data listed for Sales.TransactionDate, for instance several months or years of transaction dates where the given entity has made a multitude of purchases over an extended period of time. In selecting how much of such a depth of historical data to include in a training set, a test set, and/or data to be provided to the MLM when generating predictions, the system can employ one or more approaches.

According to one such approach, the system can extract several alternative amounts of historical records (e.g., 5, 10, 20, 50, 100), and build a model separately for each (akin to grid search). As another example, the system can aggregate the historical dynamic attributes/data to various statistical representations (e.g., mean, median, mode, standard deviation, etc.)—based on three types of categorical variables. The three types of categorical variables can include: i) categorical variables that are another column in the table of interest; ii) categorical variables that are in intermediate tables (the group-by variables); and iii) categorical variables that are that are static. In this regard, the noted intermediate tables can be tables that are between a given table and a table which holds a unique identifier for the entity. As yet another example, the system can employ various machine learning approaches applicable to analyzing length-varying variables over a certain dimension (e.g., time). As illustrations, such machine learning approaches can include Long Term Short Memory (LSTM) recurrent neural networks and convolutional networks. Further, in some embodiments, autoencoders can be employed (e.g., in view of the ability of autoencoders to reduce feature dimensionality/compress inputs).

As an illustration of handling past horizon, the system can first determine the quantity-wise statistical distribution of the data among the plurality of entities (e.g., customers) to be considered by the system. For instance, where the system is considering how much of the noted Sales.TransactionDate data to use, the system can determine the statistical distribution describing how many elements of Sales.TransactionDate data there are for each of the entities (e.g., customers).

Next, the system can determine one or more descriptors of this statistical distribution, for instance mean, median, mode and/or nth quantile (e.g., 0.6 quantile, and/or 0.7 quantile). As an illustration for the noted Sales.TransactionDate data, the system might determine the mean to be 23 elements of Sales.TransactionDate per customer, and the 0.6 quantile to be 18 elements of Sales.TransactionDate per customer. Next, the system can run one or more tests wherein the system attempts training and testing according to several of the determined descriptors, and ascertains which descriptor yields the most satisfactory predictions (e.g., the most accurate predictions, or the most accurate predictions normalized for data processing cost, such as in terms of CPU time and/or database activity).

As an illustration for the noted Sales.TransactionDate data, the system might attempt training using the mean number of Sales.TransactionDate data elements per entity (e.g., 23 data elements) and also using the 0.6 quantile number of such data elements (e.g., 18 data elements). After this, the system can determine which of the mean number of data elements and the 0.6 quantile number of data elements provided the most satisfactory predictions. After determining which of such determined descriptors provided the most satisfactory predictions, the system could use this determined descriptor for production purposes when training, testing, and/or predicting. As an illustration, for the noted Sales.TransactionDate data, the system might find that using the 0.6 quantile number of data elements provided the most satisfactory predictions, and the system might select for such production purposes the most recent 18 data elements from the Sales.TransactionDate data, as 18 is the 0.6 quantile number of data elements according to the illustration.

According to another illustration of handling past horizon and selecting how much depth of historical data to include for a given attribute when training, testing, and/or predicting, the system can use a time-delimited approach in which the system chooses those data elements, for the given attribute, which have occurred during a historical period which is h times longer than a period p for which the MLM is to generate predictions. As an illustration, where h is 3 and p is one month (e.g., where the MLM is to predict churn one month ahead), the system can choose those data elements, for the given attribute, which occurred during the previous three months. Moreover, as a further illustration of handling past horizon, the system can alternate among multiple approaches for selecting how much depth of historical data to include for a given attribute when training, testing, and/or predicting, or perform testing between the multiple approaches, and choose for production the approach which provides the most satisfactory predictions (e.g., in a manner analogous to that discussed hereinabove for testing and determination of extent to which prediction is satisfactory).

Moreover, in various embodiments the system can perform three-dimensional to two-dimensional data structure transformations (e.g., via pivoting and/or flattening) when selecting attribute data to be included in training sets, to be included in test sets, and/or to be provided to the MLM when generating predictions. Such operations can be performed by the MLM module 113. As an illustration, three-dimensional data can exist for an attribute corresponding to Sales.TransactionDate where a given entity has made multiple purchases. In this illustration, the system can generate a two-dimensional data structure (e.g., a two-dimensional array) which contains plural data items drawn from Sales.TransactionDate for the entity.

It is noted that, in various embodiments, in connection with preparing training sets and/or test sets—and/or in connection with requesting that the MLM generate predictions—the system can convert data retrieved from the data source into a different format, for instance into an array-based format and/or a sparse matrix-based format. It is also noted that, in various embodiments, in connection with preparing training sets and/or test sets—and/or in connection with requesting that the MLM generate predictions—the system can apply one or more feature engineering and/or data encoding approaches. For instance, the system can apply a Principal Component Analysis approach (PCA) or an autoencoder approach so as to reduce the quantity of features that are passed to the MLM. As an illustration, according to such an approach the system can generate k output features from p input features, where k<p, and where the p input features correspond to the selected attributes. As a further example, the feature engineering/data encoding approaches can include the use of categorical embeddings (e.g., skip-gram and/or continuous bag of words (CBOW)-based neural embedding approaches) and/or one-hot encoding.

Further, in various embodiments, the system can perform one or more data leakage prevention operations with regard to attributes whose corresponding values are fed to the MLM (e.g., in connection with training and/or prediction). Such data leakage prevention operations can be performed by the MLM module 113. In an aspect, the data leakage prevention operations can act to avoid training the MLM using values of attributes which may not be available to the MLM at prediction time. As an illustration of such attributes, suppose that the MLM was to make NBO predictions regarding other products to be purchased by a customer who orders a first item, and that this prediction was to be made at or shortly after the customer placed an order for the first item. In this illustration, an attribute regarding whether or not the customer ultimately determined to return the item (e.g., within a merchant's window for doing so) could correspond to feature data not available to the MLM at prediction time (e.g., because the window corresponds to a time which is future to ordering time). The system can implement data leakage prevention operations in a number of ways.

For example, time markers can be used for preventing data leakage. Such a time marker can, for instance, represent the last moment in time for which a prediction can/will be made. As such, any data that is inserted into the data source after the time marker can be ignored by the system in order to prevent data leakage. As another example, to prevent data leakage, the system can obtain several snapshots of the data source (e.g., tables thereof) at different points in time. Then, the system can test whether there are significant (e.g., more than marginal error of X %) differences in the data held by given columns between snapshots (e.g., the data held in a certain column for a given entity changing significantly between a first and a second snapshot). Where the system detects such a significant change for a particular column for a given entity, the system can conclude that the column has been updated (e.g., after being initially computed). Where the system concludes a column to have been updated in this way, the system can opt to not utilize data from this column when providing inputs to the MLM. In this way, the system can act to prevent data leakage.

In various embodiments, time marker functionality can distinguish between event-driven/momentary predictions (e.g., predicting lifetime value at the moment of the user's registration) and repeated predictions (e.g., predicting whether a user would churn, every week on Sunday morning). For the former, the time marker can be the event that would trigger the prediction. For the latter, the system can create a compound entity, comprising the original entity, multiplied by each periodic time point—the frequency of which (time stride) is determined by the user, or according to the expected prediction frequency. For example, where the system is to predict churn each Sunday, the system can take the entity (e.g., customer), and cross join it with all the historical relevant Sundays in the data source. For each of these compound entities, the system can create a separate data point for the MLM. The periodic time-points can serve as the time markers for each compound entity, respectively.

With further regard to prevention of data leakage, in various embodiments data held in the data store can be date stamped. As such, where the system finds that a date stamp associated with data held with respect to a potential attribute was future to an intended prediction time, the system can determine that such an attribute not be utilized for training and/or prediction. As examples, where the system determines that a given attribute not be utilized the system can: a) not include the attribute when recommending attributes to the user; and/or b) in the case where the user suggests use of the attribute, advise (e.g., via a UI message) the user against using the attribute. Returning to the illustration, the system might find a timestamp associated with data indicating whether or not the customer returned the item was future to the intended prediction time of at or shortly after the item being ordered. As such, the system might determine that such an attribute regarding item return not be utilized for training and/or prediction.

Moreover, in various embodiments the system can perform one or more of: a) hyperparameter selection operations; b) data normalization operations; and c) handling of missing and/or broken values of attributes. Such operations can be performed by the MLM module 113. Turning to hyperparameter selection operations, the system can, as examples, utilize random search and/or grid search in selecting hyperparameters. The hyperparameters which the system selects can include both optimizer hyperparameters and MLM hyperparameters. As illustrations, the hyperparameters which the system selects can include quantity of layers, quantity of neurons for each layer, and learning rate, to name just a few. It is noted that the MLM discussed herein throughout can be a classifier MLM, a random forest MLM, or a neural network MLM (e.g., a multilayer perceptron neural network), to name just a few possibilities. Turning to data normalization operations, the system can, as examples, utilize Z-score normalization, point relative normalization, and/or maximum/minimum normalization in normalizing values for attributes among given entities (e.g., among customers).

Turning to handling of missing and/or broken values of attributes, the system can consider a value for a given attribute to be missing where the value is null or zero. Further, the system can consider a value to be "broken" where the value is out of place and/or unexpected. For instance, where the system finds the value for a given attribute of a given entity to differ greatly other values for the attribute from other entities (e.g., to differ by more than three standard deviations of a mean of such values), the system can consider the value to be broken. As an illustration, suppose that entities are customers and that a given attribute is total annual spending. In this illustration, where the average total annual spending across all customers is $600, where the value of this attribute were $2,000,000 for a given customer, this value could be considered to be "broken" by the system (e.g., due to $2,000,000 being more than three standard deviations away from $600). Where the system determines a given value to be missing or broken, the system can, in some embodiments, replace the value. As one example, the system can employ an imputation approach to generate an estimated reconstruction of the missing or broken value. Then, the system can replace the missing or broken value with the reconstruction. As one illustration, the imputation approach can employ a denoising autoencoder with partial loss (DAPL) or other autoencoder. As another example, the system can employ a PCA-based imputation approach. As another example, the system might replace the value with an average for the value among others of the relevant entities. Continuing with the illustration, the $2,000,000 value might be replaced with the average value of $600. Also, in some embodiments, where a given entity (e.g., a particular customer) has for one of the attributes a missing or broken value, the system might not use that given entity in training or prediction. For instance, where data for the given entity is part of a training set, the system might not use data of the entity in training the MLM. Likewise, where a prediction has been requested for the given entity, the system might not generate such a prediction. As such, the system might generate a UI message identifying the given entity (e.g., by customer number) and explaining that no prediction is being made for the given entity due to the missing or broken value.

Figure 9:
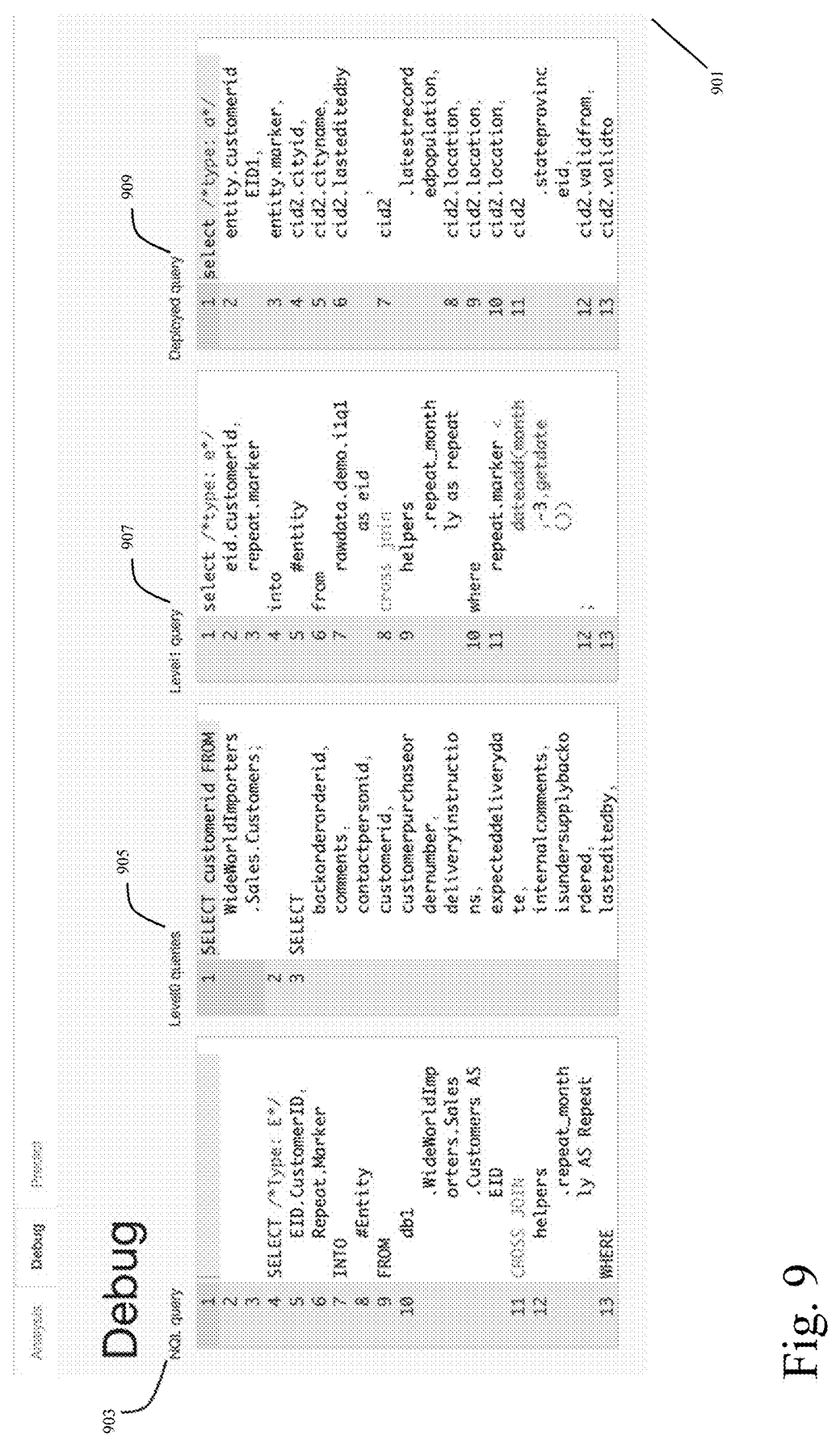

As referenced above, in various embodiments the system can formulate queries (e.g., SQL queries) to draw data from the data source. Shown in FIG. 9 is a UI screen 901 which allows the user to view and/or edit various such queries. In particular, depicted in FIG. 9 are four UI frames: a) an "NQL query" frame 903; b) a "Level0 queries" frame 905; c) a "level1 query" frame 907; and d) a "Deployed query" frame 909.

The NQL query frame 903 can contain code corresponding to queries generated by the system responsive to the user's inputs regarding entity and target. The Level0 queries frame 905 can contain code corresponding to queries generated by the system responsive to the user's inputs regarding attributes. The Level1 query frame 907 can contain code corresponding to system-generated queries which unify the queries of the NQL query and Level0 queries UI frames. The Level1 query frame can further contain code for creating indexes in the data source (e.g., clustered indexes) which correspond such unified queries. The Deployed query frame 909 can contain code like that of the Level1 query frame 907, but without the code for creating indices. As such, the code of the Deployed query frame 909 can, relative to the code of the Level1 query frame 907, allow for queries to be performed without the overhead of index creation. In some embodiments, the view/edit functionality of FIG. 9 can be provided via UI screen labeled "Debug" and/or accessed via a UI tab labeled "debug."

Figure 10A:
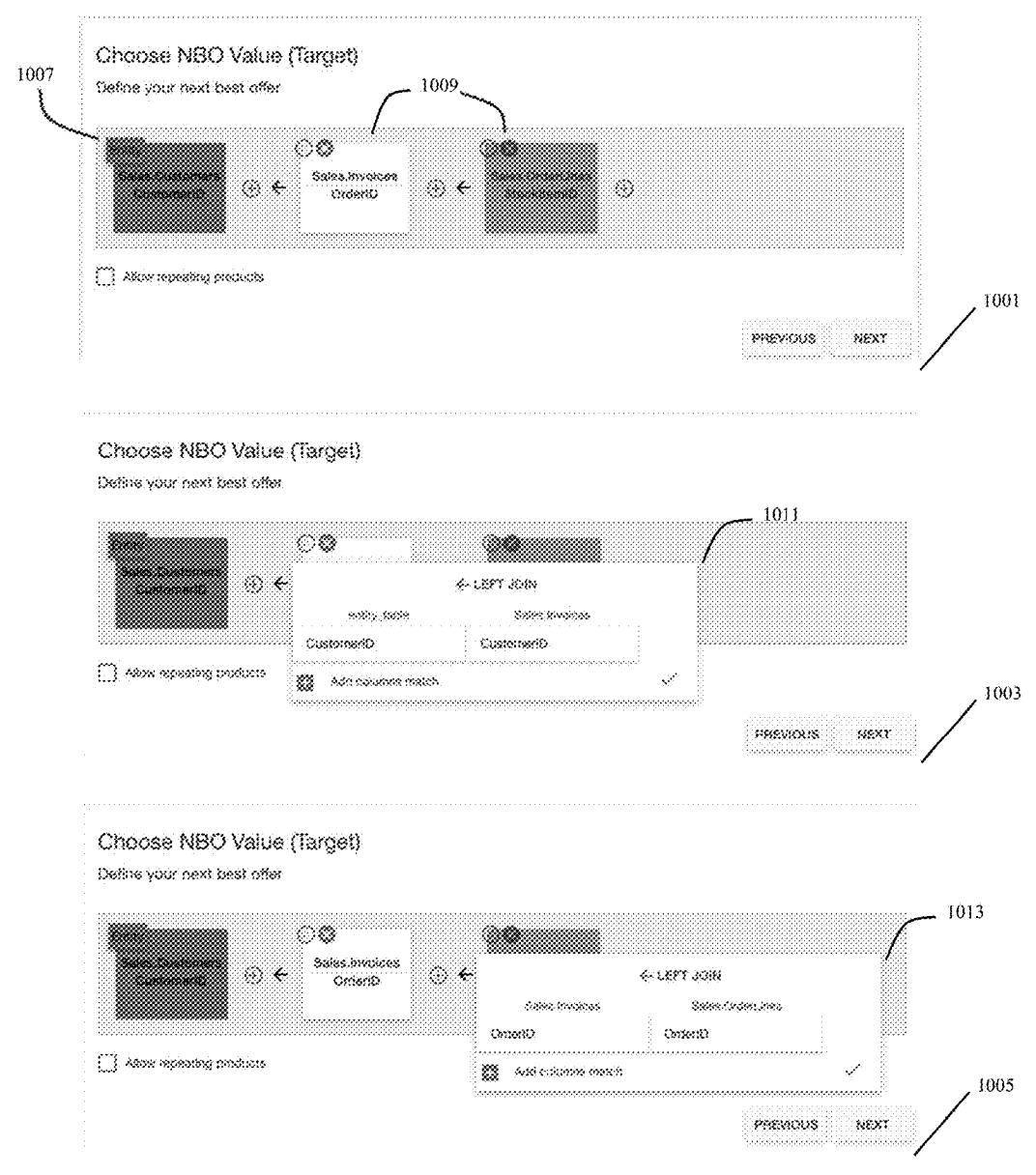

As referenced above, various joins can be formulated in connection with the functionality discussed herein. The system can use these joins to query the data source, and can further generate data structures which correspond to the results of the queries. Turning to FIG. 10A, shown are three UI screens 1001-1005 regarding selection of target. As depicted by the topmost UI screen 1001 of FIG. 10A, the user has: a) previously specified (1007) Sales.Customers.CustomerID in connection with entity; and b) specified (1009) Sales. Invoices.OrderID and SalesOrderLines.StockItemID in connection with target. In the middle UI screen 1003 of FIG. 10A, the system has requested (1011) that the user define a join between: a) the Sales.Customers table specified by the user in connection with entity; and b) the Sales. Invoices table specified by the user in connection with target. As shown by FIG. 10A, the user has specified a left join over Sales.Customers.CustomerID and Salesinvoices.CustomerID. Then, in the bottommost UI screen 1005 of FIG. 10A, the system has requested (1013) that the user define a join between: a) the Sales. Invoices table specified by the user in connection with target; and b) the Sales.Orderlines table specified by the user in connection with target. As shown by the figure, the user has specified a left join over Salesinvoices.OrderID and Sales.OrderLines.OrderID. The system can generate a data structure which combines the results of both joins. Alternately or additionally, the system can generate a data structure corresponding to the results of just the first join and/or a data structure corresponding to the results of just the second join.

Figure 10B:
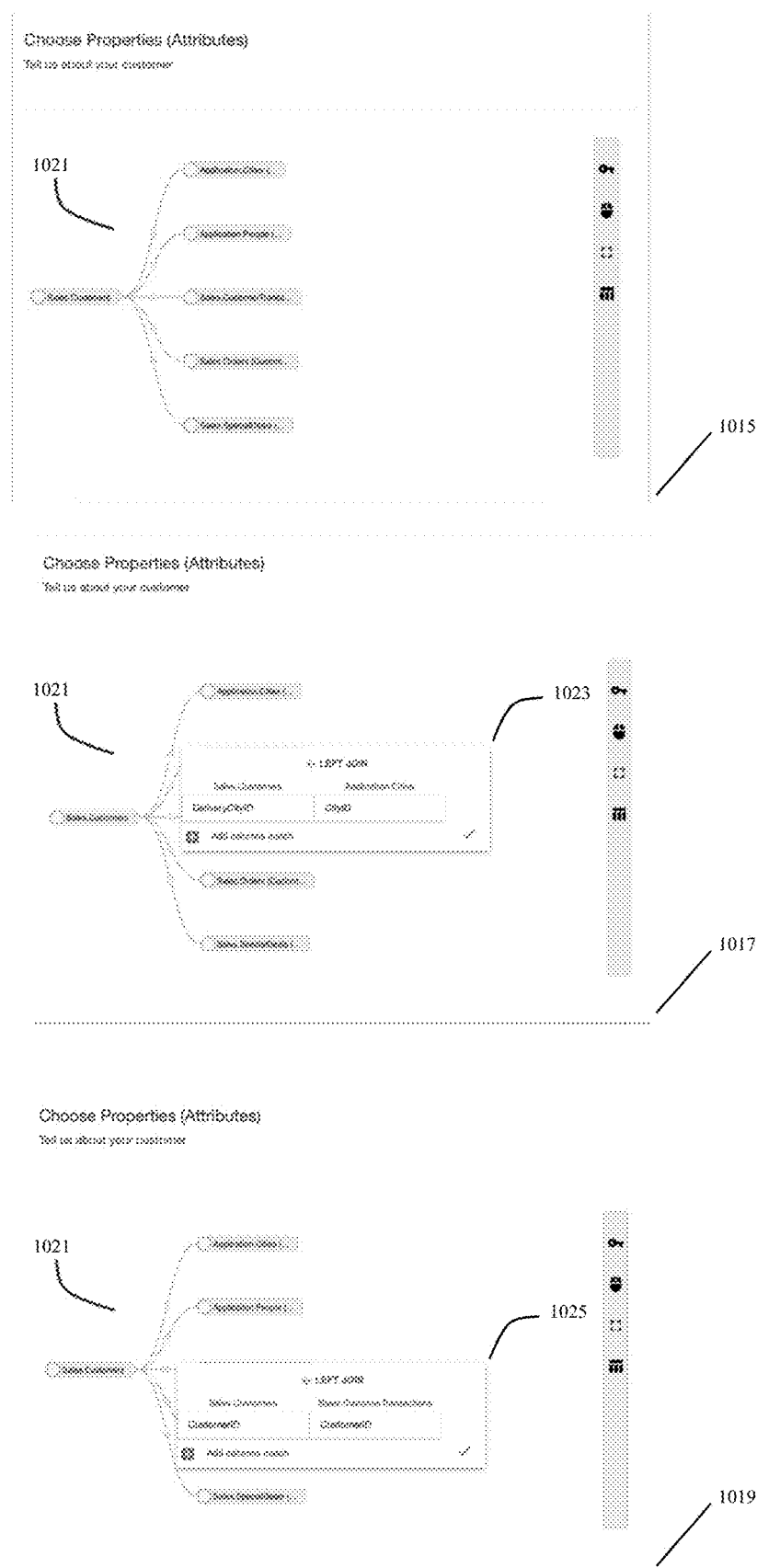
FIG. 10B is a further exemplary diagram illustrating one embodiment of three graphical user interfaces which allow for selection of attributes using the data structuring system of FIG. 1.

Likewise, turning to FIG. 10B shown are three UI screens 1015-1019 regarding selection of attributes. As depicted by the topmost UI screen 1015 of FIG. 10B, the user has pressed the above-discussed key icon 503 and has received system-suggested attributes in reply via the displayed tree-like diagram. The tree-like diagram 1021 of FIG. 10B, as discussed above, depicts tables connected via lines, where the lines represent joins between the tables. As referenced above, by clicking on the lines the user can view and/or edit the joins. In the middle UI screen 1017 of FIG. 10B, the user has clicked on the line of the tree between the Sales.Customers table and the Application.Cities table. In reply, the user has learned (1023) that these two tables are presently subject to a system-generated left join over Sales.Customers.DeliveryCityID and Application.Cities.CityID. Then, in the bottommost UI screen 1019 of FIG. 10B, the user has clicked on the line of the tree between the Sales.Customers table and the Sales.CustomerTransactions table. In reply, the user can learn (1025) that these two tables are presently subject to a system-generated left join over Sales.Customers.CustomerID and Sales.CustomerTransactions.CustomerID. Likewise, by clicking on others of the lines of the tree the user can learn of the joins to which other tables depicted by the UI are subject. Akin to the functionality discussed in connection with FIG. 10A, the system can generate a data structure which combines the results of all of these joins, and/or can generate individual data structures corresponding to individual ones of the joins.

Various approaches can be used in deploying the trained MLM into a production environment. As one example, a real-time Application Program Interface (API)-based deployment approach can be used. According to this approach, the inference components of the MLM (e.g., the normalization, encoding, and/or feature engineering components) can be wrapped in a container (e.g., a Docker container) by the system. Subsequently, the container can be downloaded (e.g., by the user) and installed in the production environment. Further according to this approach, the MLM can be accessed (e.g., queried) through the API. In some embodiments, the API can be a Representation State Transfer (RESTful) API. As another example, an automatic data source update (e.g., database update)-based deployment approach can be used. According to this approach, the system can connect to the data source and update a table (e.g., a dedicated table) with predictions generated by the MLM. In some embodiments, these updates can be made according to a schedule.

Additionally and/or alternatively, the system can query external data and enrich a user's data for a more accurate prediction model. For example, external data can include holidays, special events, weather, financial data, and so on.

Hardware and Software

According to various embodiments, various functionality discussed herein can be performed by and/or with the help of one or more computers. Such a computer can be and/or incorporate, as just some examples, a personal computer, a server, a smartphone, a system-on-a-chip, and/or a microcontroller. Such a computer can, in various embodiments, run Linux, MacOS, Windows, or another operating system.

Figure 11:
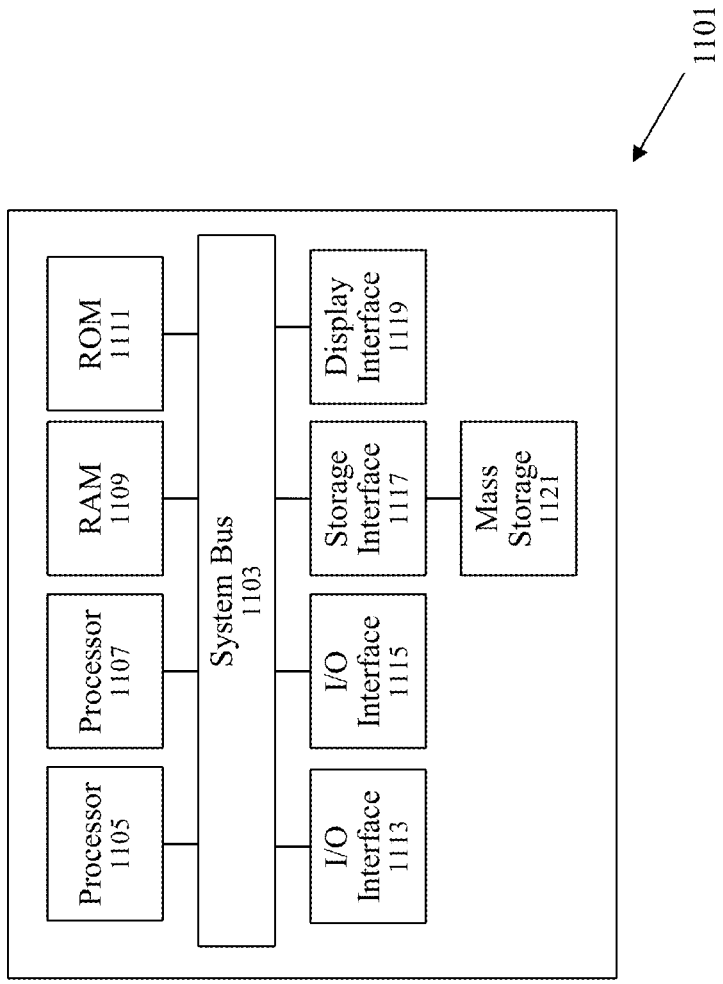
FIG. 11 shows an exemplary computer.

Such a computer can also be and/or incorporate one or more processors operatively connected to one or more memory or storage units, wherein the memory or storage may contain data, algorithms, and/or program code, and the processor or processors may execute the program code and/or manipulate the program code, data, and/or algorithms. Shown in FIG. 11 is an example computer employable in various embodiments of the present invention. Exemplary computer 1101 includes system bus 1103 which operatively connects two processors 1105 and 1107, random access memory (RAM) 1109, read-only memory (ROM) 1111, input output (I/O) interfaces 1113 and 1115, storage interface 1117, and display interface 1119. Storage interface 1117 in turn connects to mass storage 1121. Each of I/O interfaces 1113 and 1115 can, as just some examples, be a Universal Serial Bus (USB), a Thunderbolt, an Ethernet, a Bluetooth, a Long Term Evolution (LTE), an IEEE 488 and/or other interface. Mass storage 1121 can be a flash drive, a hard drive, an optical drive, or a memory chip, as just some possibilities. Processors 1105 and 1107 can each be, as just some examples, a commonly known processor such as an ARM-based or x86-based processor. Computer 1101 can, in various embodiments, include or be connected to a touch screen, a mouse, and/or a keyboard. Computer 1101 can additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using Python, Java, Swift, C, C++, C #, and/or another language. Corresponding program code might be placed on media such as, for example, DVD, CD-ROM, memory card, and/or floppy disk. It is noted that any indicated division of operations among particular software modules is for purposes of illustration, and that alternate divisions of operation may be employed. Accordingly, any operations indicated as being performed by one software module might instead be performed by a plurality of software modules. Similarly, any operations indicated as being performed by a plurality of modules might instead be performed by a single module. It is noted that operations indicated as being performed by a particular computer might instead be performed by a plurality of computers. It is further noted that, in various embodiments, peer-to-peer and/or grid computing techniques may be employed. It is additionally noted that, in various embodiments, remote communication among software modules may occur. Such remote communication might, for example, involve JavaScript Object Notation-Remote Procedure Call (JSON-RPC), Simple Object Access Protocol (SOAP), Java Messaging Service (JMS), Remote Method Invocation (RMI), Remote Procedure Call (RPC), sockets, and/or pipes.

Moreover, in various embodiments the functionality discussed herein can be implemented using special-purpose circuitry, such as via one or more integrated circuits, Application Specific Integrated Circuits (ASICs), or Field Programmable Gate Arrays (FPGAs). A Hardware Description Language (HDL) can, in various embodiments, be employed in instantiating the functionality discussed herein. Such an HDL can, as just some examples, be Verilog or Very High Speed Integrated Circuit Hardware Description Language (VHDL). More generally, various embodiments can be implemented using hardwired circuitry without or without software instructions. As such, the functionality discussed herein is limited neither to any specific combination of hardware circuitry and software, nor to any particular source for the instructions executed by the data processing system.

RAMIFICATIONS AND SCOPE

Although the description above contains many specifics, these are merely provided to illustrate the invention and should not be construed as limitations of the invention's scope. Thus, it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

The invention claimed is:

1. A computer-implemented method comprising:
receiving, at a computing system, via a user interface, information regarding entities for which predictions are to be generated by a machine learning model, wherein the information regarding the entities comprises an indication of a first key for accessing unique identifiers of the entities, and an indication of a first table which contains the first key;
finding, by the computing system, in the first table, at least one second key associated with the first key; and
for each of the at least one second keys:
accessing, by the computing system, at least one second table;
determining, by the computing system, in the at least one second table, at least one third key to have a name similar but not identical to a name of the at least one second key;
finding, by the computing system, in the second table, some or all keys associated in the second table with the determined third key; and
suggesting, by the computing system, via the user interface, as attributes for the machine learning model, one or more of said keys found in the second table, wherein the attributes correspond to features.

2. The computer-implemented method of claim 1, further comprising the computing system recursively suggesting further keys as attributes for the machine learning model, wherein said recursive suggesting comprises:
finding, by the computing system, in a respective table, one or more foreign keys; and
following, by the computing system, one or more of the foreign keys to one or more further tables.

3. The computer-implemented method of claim 1, further comprising:
suggesting, by the computing system, one or more of the second keys or the third keys as attributes for the machine learning model.

4. The computer-implemented method of claim 1, further comprising receiving, at the computing system, a selection of a prediction type, wherein the predictions to be generated are of the selected prediction type.

5. The computer-implemented method of claim 4, wherein the selected prediction type is fraud detection, lifetime value, churn, next best offer, lead scoring, or Structured Query Language (SQL) query-based custom.

6. The computer-implemented method of claim 1, further comprising:
receiving, at the computing system, information regarding a target, wherein the target provides definitions for the predictions.

7. The computer-implemented method of claim 6, wherein the information regarding the target comprises one or more of:
indication of a key for accessing evidence of entity action/inaction;
indication of a goal;
indication of a key for accessing date information; and
indication of a timeframe.

8. The computer-implemented method of claim 1, further comprising training, by the computing system, the machine learning model, wherein the computing system provides to the machine learning model, as training data inputs, data which correspond to one or more of the suggested keys.

9. The computer-implemented method of claim 1, further comprising:
for each of one or more entities for which predictions are to be generated:
providing, by the computing system, to the machine learning model as input features, data which correspond to one or more of the suggested keys; and
receiving, by the computing system from the machine learning model, a prediction generated by the machine learning model.

10. The computer-implemented method of claim 1, further comprising generating, by the computing system, one or more characterizations of quality of predictions generated by the machine learning model, wherein said characterizations include one or more of receiver operating characteristic curves, confusion matrices, and comparisons to prediction qualities of other machine learning models.

11. A system comprising:
at least one processor; and
a memory storing instructions that, when executed by the at least one processor, cause the system to perform:
receiving, via a user interface, information regarding entities for which predictions are to be generated by a machine learning model, wherein the information regarding the entities comprises an indication of a first key for accessing unique identifiers of the entities, and an indication of a first table which contains the first key;

finding in the first table, at least one second key associated with the first key; and for each of the at least one second keys:
- accessing at least one second table;
- determining, in the at least one second table, at least one third key to have a name similar but not identical to a name of the at least one second key;
- finding in the second table, some or all keys associated in the second table with the determined third key; and
- suggesting, via the user interface, as attributes for the machine learning model, one or more of said keys found in the second table, wherein the attributes correspond to features.

12. The system of claim 11, wherein the instructions, when executed by the at least one processor, further cause the system to recursively suggest further keys as attributes for the machine learning model, wherein said recursive suggesting comprises:
- finding, in a respective table, one or more foreign keys; and
- following one or more of the foreign keys to one or more further tables.

13. The system of claim 11, wherein the instructions, when executed by the at least one processor, further cause the system to perform:
- suggesting one or more of the second keys or the third keys as attributes for the machine learning model.

14. The system of claim 11, wherein the instructions, when executed by the at least one processor, further cause the system to perform:
- receiving a selection of a prediction type, wherein the predictions to be generated are of the selected prediction type.

15. The system of claim 11, wherein the instructions, when executed by the at least one processor, further cause the system to perform:
- receiving information regarding a target, wherein the target provides definitions for the predictions.

16. A non-transitory computer-readable storage medium including instructions that, when executed by at least one processor of a computing system, cause the computing system to perform a method comprising:

receiving, via a user interface, information regarding entities for which predictions are to be generated by a machine learning model, wherein the information regarding the entities comprises an indication of a first key for accessing unique identifiers of the entities, and an indication of a first table which contains the first key;

finding in the first table, at least one second key associated with the first key; and for each of the at least one second keys:
- accessing at least one second table;
- determining, in the at least one second table, at least one third key to have a name similar but not identical to a name of the at least one second key;
- finding in the second table, some or all keys associated in the second table with the determined third key; and
- suggesting, via the user interface, as attributes for the machine learning model, one or more of said keys found in the second table, wherein the attributes correspond to features.

17. The non-transitory computer-readable storage medium of claim 16, wherein the instructions, when executed by the at least one processor of the computing system, further cause the computing system to recursively suggest further keys as attributes for the machine learning model, wherein said recursive suggesting comprises:
- finding, in a respective table, one or more foreign keys; and
- following one or more of the foreign keys to one or more further tables.

18. The non-transitory computer-readable storage medium of claim 16, wherein the instructions, when executed by the at least one processor of the computing system, further cause the computing system to perform:
- suggesting one or more of the second keys or the third keys as attributes for the machine learning model.

19. The non-transitory computer-readable storage medium of claim 16, wherein the instructions, when executed by the at least one processor of the computing system, further cause the computing system to perform:
- receiving a selection of a prediction type, wherein the predictions to be generated are of the selected prediction type.

20. The non-transitory computer-readable storage medium of claim 16, wherein the instructions, when executed by the at least one processor of the computing system, further cause the computing system to perform:
- receiving information regarding a target, wherein the target provides definitions for the predictions.

* * * * *